April 26, 1966 L. W. LANGLEY 3,247,929
ARTICLE SUPPLYING SYSTEM
Filed Nov. 21, 1961 5 Sheets-Sheet 1

INVENTOR:
LAWRENCE W. LANGLEY,
BY James G. Williams
HIS ATTORNEY.

April 26, 1966  L. W. LANGLEY  3,247,929
ARTICLE SUPPLYING SYSTEM
Filed Nov. 21, 1961   5 Sheets-Sheet 2

INVENTOR:
LAWRENCE W. LANGLEY,
BY James J. Williams
HIS ATTORNEY.

April 26, 1966   L. W. LANGLEY   3,247,929
ARTICLE SUPPLYING SYSTEM
Filed Nov. 21, 1961   5 Sheets-Sheet 3

INVENTOR:
LAWRENCE W. LANGLEY,
BY James J. Williams
HIS ATTORNEY.

April 26, 1966   L. W. LANGLEY   3,247,929
ARTICLE SUPPLYING SYSTEM
Filed Nov. 21, 1961   5 Sheets-Sheet 5

INVENTOR:
LAWRENCE W. LANGLEY,
BY *James J. Williams*
HIS ATTORNEY.

United States Patent Office 3,247,929
Patented Apr. 26, 1966

3,247,929
ARTICLE SUPPLYING SYSTEM
Lawrence W. Langley, Waynesboro, Va., assignor to General Electric Company, a corporation of New York
Filed Nov. 21, 1961, Ser. No. 153,929
3 Claims. (Cl. 186—1)

The invention relates to an article supplying system, and particularly to such a system for supplying articles from a plurality of sources to a conveyor.

In recent years, article handling, particularly in warehouses, has progressed from the condition where articles were handled physically by people to the present condition where articles are handled to a large degree by mechanical conveyors and associated apparatus. An example of this present condition may be found in a warehouse where a number of kinds of articles (usually in cartons or boxes) are stored to be selected in filling an order. Such an order may specify various quantities of a number of different kinds of articles. All the articles of such an order are usually conveyed to a common point for delivery. The articles are conveyed on some sort of mechanical conveyor which receives the articles from their sources such as racks and conveys them to the desired delivery point. While such conveyors speed up the filling of an order and reduce the human considerations, the expense of such conveyors may outweigh their usefulness, particularly if the conveyors are not used to capacity.

Therefore an object of the invention is to provide an improved article supplying system.

Another object of the invention is to improve the usefulness of article conveyors.

Article handling conveyors have been provided with increased capacity by automatic or automated devices. Such devices permit an order to be indicated electrically or electronically, such indications being used to cause the appropriate articles to be supplied to the conveyor from their sources. But such devices have previously provided a limited increased capacity for conveyors so that even with such devices, a conveyor may, under certain conditions, be used to only a small fraction of its capacity.

Therefore another object of the invention is to provide an article supplying system which effectively increases the capacity of a conveyor.

Another object of the invention is to provide an article supplying system which permits an automated conveyor to be used to a greater degree.

In addition to being able to provide limited increased capacity for conveyors, existing automated devices for conveyors are further limited in the flexibility and versatility with which they can be used. Thus, the sequence in which articles are delivered from their sources may be limited by the necessity of increased capacity of the conveyor. Or, the increased capacity of the conveyor may be limited by the sequence in which the articles are to be delivered or must be delivered.

Therefore another object of the invention is to provide an article supplying system which provides increased conveyor capacity and which permits any desired kind and quantity of articles to be selected and conveyed.

Another object of the invention is to provide an article supplying system that permits a conveyor to be utilized to substantially its maximum capacity.

Another object of the invention is to provide an article supplying system which permits simultaneous delivery of articles from a plurality of sources.

Generally, the article supplying system of the invention is intended to be utilized with a conveyor installation. In such an installation, various kinds and quantities of articles are supplied from sources, and conveyed in a sequence to any desired point. Further, the article supplying system is intended to be utilized with means which may supply signals indicative of the kind and quantity of articles which are to be ultimately conveyed after having been supplied from their sources. Briefly, the article supplying system comprises means for conveying these or related signals in a manner related to the motion of the article conveyor. It further comprises deriving means responsive to the conveyed signals for actuating the sources in response to these derived conveyed signals. The deriving means are respectively coupled to the article sources so that each article source is only responsive to and actuated by conveyed signals which correspond to that article source. With such an article supplying system, it is possible to supply articles from a plurality of sources so that they appear in any desired kind, quantity, and sequence on the conveyor which is utilized to substantially its maximum capacity.

The subject matter of the invention is particularly pointed out and distinctly claimed in the concluding portion of this specification. The invention, its structure, its operation, and further objects and advantages thereof may be better understood by reference to the following description taken in connection with the accompanying drawing in which:

*System description*

Figure 1:
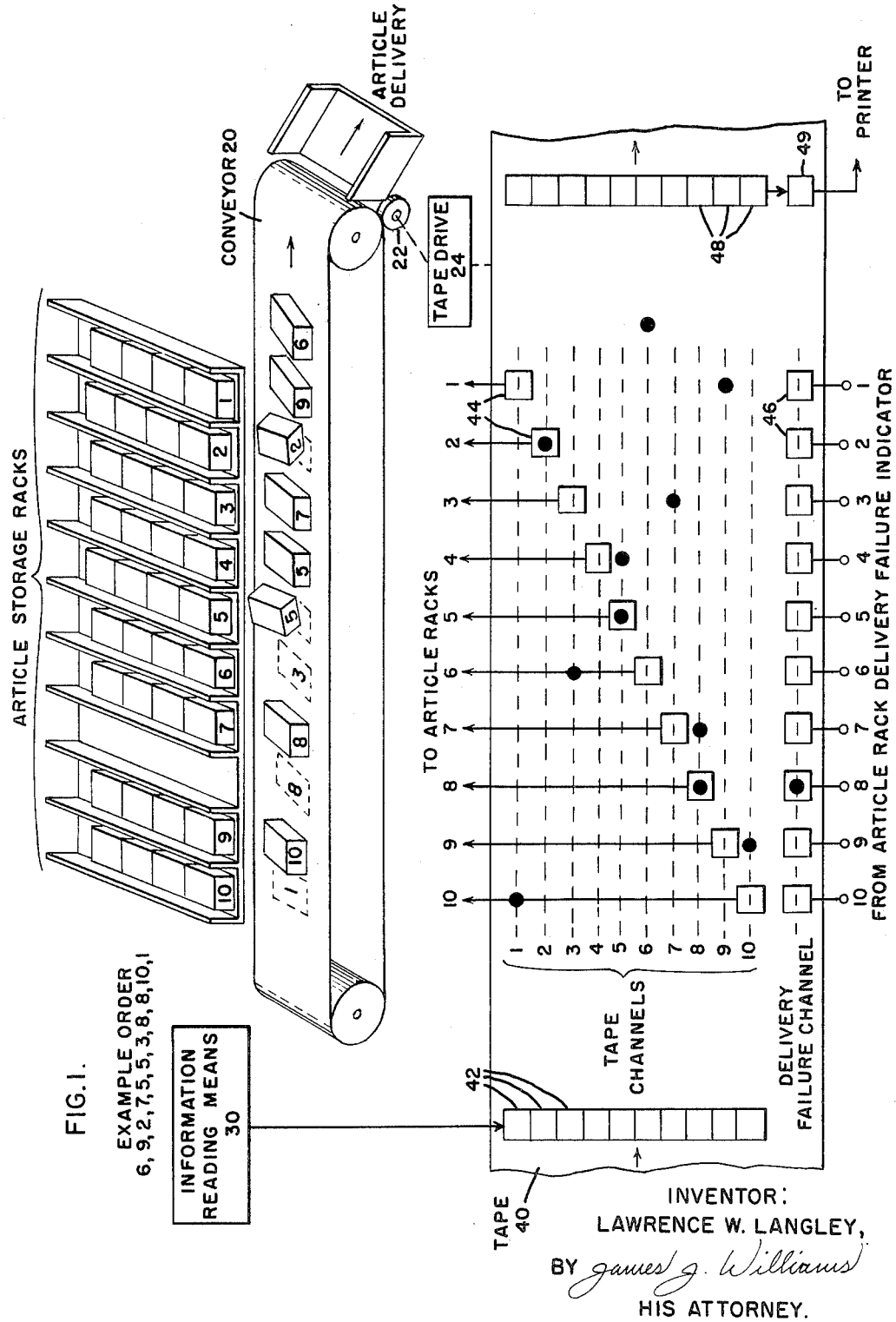
FIGURE 1 shows an over-all diagram, partly in perspective form, partly in block diagram form, and partly in schematic form, of an article supplying system in accordance with the invention.
Figure 3:
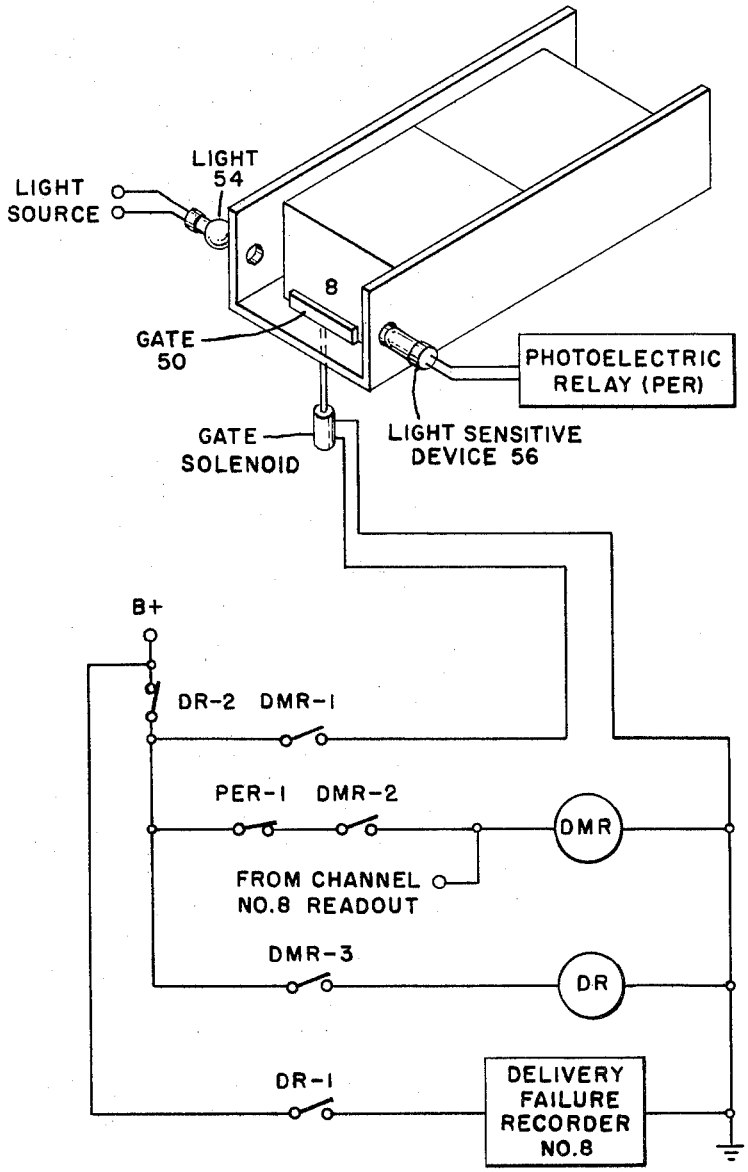
FIGURE 3 shows a schematic diagram of an optional embodiment of a gate control portion for use with the article supplying system shown in FIGURE 1.

FIGURE 1 shows over-all article supplying system of the invention. The embodiment of the article supplying system shown in FIGURE 1 contemplates that the article supplying system is being used in a warehouse. However, the article supplying system may be used in a number of other applications which will be apparent to persons skilled in the art. In the warehouse contemplated, a conveyor 20 is intended to move past a plurality (for example ten as shown) of article storage racks or bins and deliver articles supplied to it from the racks to a specified point or location. The article storage racks or bins are shown immediately adjacent one another, but they may actually be spaced and located in any desired manner. The article storage racks are shown as being sloped so that the articles tend to slide downward and drop onto the conveyor 20 by gravity. The articles are prevented from sliding by means of gates which may mechanically hold the articles in place until delivery or discharge of an article is desired, and which will deliver one article upon receipt of one delivery impulse. Such gates may take many forms and may be actuated in any manner desired. One form of a gate is shown in FIGURE 3. This gate will be explained subsequently. The storage racks may take other forms and need not be sloped. The ten article storage racks shown are supplied with articles or packages or cartons which, for purposes of identification, have been numbered 1 through 10. The conveyor 20 receives articles supplied to it and delivers them to a common article delivery point such as a shipping platform. Although the cartons or articles are numbered 1 through 10 in a consecutive manner in the storage racks, they may be numbered in any desired manner or given any desired sequence or arrangement. The conveyor 20 is driven by suitable means (not shown), and is provided with a takeoff or conveyor motion sensing device 22. This motion sensitive device 22 is arranged so that it senses, in any desired form such as a mechanical form, the actual motion of the conveyor 20. The motion of the conveyor driving machinery is an acceptable second choice of the variable to be sensed. The motion sensitive device 22 provides an output, again in any desired form such as mechanical form, which is used to operate or drive a signal conveying means in synchronism with the article conveyor 20. In FIGURE 1, the signal conveying means is a tape 40 which is driven or operated by a tape drive 24. The tape drive 24 is coupled as indicated by dashed lines between the motion sensitive device 22 and the tape 40.

Signals to operate the article supplying system are derived and supplied by the information reading means 30 shown in block diagram form. As will also be subsequently explained, these means 30 may take a number of embodiments. In essence, the information reading means 30 is supplied with information which may take a number of forms such as punched cards. The reading means 30 scans or reads these cards and supplies electrical signals in response to the information contained on such cards. These signals may or may not be modified and are supplied to the signal conveying means.

The signal conveying means may take a number of embodiments. In FIGURE 1 it is shown as being a tape 40. This tape 40 may also take a number of forms such as magnetic tape which receives electrical or magnetic signals or paper tape which is mechanically punched. For simplicity of explanation, it has been assmued that the tape 40 is a paper tape which is mechanically punched to provide the tape 40 with the desired information. Since the embodiment shown in FIGURE 1 contemplates that there may be ten kinds of articles, the tap 40 has been provided with ten tape channels numbered 1 through 10 and indicated by the dashed lines. In addition, the tape 40 is provided with a delivedy failure channel, which, in FIGURE 1, is indicated by the dashed line located at the bottom of the tape 40. Each of the ten tape channels is provided with its respective tape channel recording head 42 and its respective tape channel readout head 44. Each of the tape channel recording heads 42 may be located at the same point relative to the tape motion. However, the tape channel readout heads 44 are located at different points relative to the path of the tape. These different points have positions relative to each other which correspond to the positions of the article racks relative to each other. In this way signals from the tape channels arrive at their respective tape channel readout heads 44 at the proper time for derivation and for causing the article storage racks to provide the desired delivery of articles to the conveyor 20 at the desired time. Thus, the tape 40, its speed of movement, and the spacing of the tape channel readout heads 44 are all related to and effectively synchronized with the conveyor 20, its speed of movement, and the spacing of the article storage racks. As used herein, spacing does not mean that the racks or readout heads must be separated by some appreciable distance, but may mean any distance, however small. A uniform motion of the conveyor 20 and the tape 40 is the most practical. However, non-uniform motion may be desirable in some instances. Such non-uniform motion is possible as long as proper synchronization and relationship is maintained between the conveyor 20 and the tape 40. It should be apparent that the speed of the tape 40 and the spacing of the tape channel readout heads 44 may have any proportion relative to the speed of the conveyor 20 and the spacing of the article storage racks. In other words, the ratio of tape speed to conveyor speed must be substantially the same as or proportional to the ratio of readout head spacing to article rack spacing. Thus if the ratio of conveyor speed to tape speed is 1000:1, then the ratio of article rack spacing to readout head spacing should also be 1000:1 within tolerance limits. The space channel recording heads 42 are arranged to punch (a punch being indicated in FIGURE 1 by a black dot) the tape 40 at the desired point and in the desired manner in response to signals from the reading means 30. The tape channel readout heads 44 are arranged to respond to their respective tape channel punches and produce a signal. Each of the tape channel readout heads 44 is coupled to its respective article storage rack gate operating mechanism so as to operate the gate mechanism in response to a signal. The delivery failure channel, which is optional, may be provided with ten delivery failure recording heads 46 which are located at substantially the same points relative to the tape motion as the tape channel recording heads 44. The delivery failure recording heads 46 are arranged to punch the tape 40 at the desired point and in the desired manner in response to article delivery failure indicators. Ten tape channel delivery readout heads 48 (one for each channel) and one delivery failure channel readout head 49 are provided, these readout heads 48, 49 all being positioned at the same point relative to the path of tape motion. The readout heads 48, 49 are arranged to respond to their respective channel punches and produce a signal. If a signal is supplied by a delivery readout head 48 at approximately the same time or slightly after a signal is supplied by the delivery failure channel readout head 49, the combination of these two signals may be for indication purposes, such as a printer mechanism, as will be explained subsequently.

In FIGURE 1, the black dot indicating punches in the tape 40 are shown in various stages including punches which have not been read by readout heads, punches which are being read by readout heads, and punches which have already been read by readout heads. Punches which are being read are indicated by a black dot which is within the block outline of a readout head.

*System operation*

An illustrative example of operation of the system described above in connection with FIGURE 1 will be given. In this illustrative example, it has been assumed that an order has been placed which calls for eleven articles to be delivered at the delivery point in the following sequence: Article 6, article 9, article 2, article 7, article 5, article 5, article 3, article 8, article 8, article 10, and article 1. The order assumed in the example may be prepared for the system by appropriately punching cards which are designed to be scanned by the information reading means 30. For simplicity, it has been assumed that each card indicates only one article, and if more than one of the same article is to be selected, then more cards must be prepared for that article. The cards indicating the kind and quantity of articles desired are fed into the information reading means 30 in the sequence in which the articles are to be delivered. This sequence may be random or intentionally arranged. The cards are fed through the information reading means 30 which supply signals indicative of the information on the cards. The signals are respectively applied to the tape channel recording heads 42 which cause the tape 40 to be punched in the appropriate channels as it moves beneath the tape channel recording heads 42. In FIGURE 1, the tape 40 is shown with all of the example order punched on it. Also in FIGURE 1, operation is at the point when article 2, article 5, and article 8 are being delivered or are supposed to be delivered to the conveyor 20. It will be seen that the position of the articles on the conveyor 20 relative to the article storage racks agrees or coincides with the position of the punches in the tape channels relative to the tape channel readout heads 44. Thus, article 6 has passed the rack for article 1, and the punch in channel 6 has passed the channel 1 readout head. Article 9 is adjacent the rack for article 1, and the punch in channel 9 is adjacent the channel 1 readout head. Article 2 is being delivered to the conveyor 20 behind article 9, and the punch in channel 2 is under the channel 2 readout head. Article 7 is adjacent the rack for article 3, and the punch in channel 7 is adjacent the channel 3 readout head. The first article 5 is adjacent the rack for article 4, and the first punch in channel 5 is adjacent the channel 4 readout head. The second article 5 is being delivered, and the second punch in channel 5 is under the channel 5 readout head. The next space on the conveyor 20, indicated as being reserved for article 3, is adjacent the rack for article 6, and the punch in channel 3 is adjacent the channel 6 readout head. Since the space reserved for article 3 has not passed the rack containing article 3, this space is still empty. The first article 8 is adjacent the rack for article 7, and the first punch in channel 8 is adjacent the channel 7 readout head. The space reserved for the second article 8 should have received an article 8, but it has been assumed for illustrative purposes that the rack for article 8 became empty after delivering the first article 8. Thus there was no delivery of the second article 8. The second punch in channel 8 is under the channel 8 readout head. It will be noted that the delivery failure channel is punched at this point, this punch having been made by the delivery failure recording head for rack 8 at the time an article 8 should have been delivered. No mechanism for sensing failure to deliver in response to punches in the tape channels has been shown in FIGURE 1, but it may be appreciated that this function can be performed by limit switches, photoelectric or other sensing devices, and that a signal to energize the delivery failure channel punch can be generated by such devices. The combined presence of punches in the delivery failure channel and the tape channel may be used to actuate a printing mechanism for indicating that the delivery failure of a particular article occurred. In this case, when the second punch in channel 8 and the punch in the delivery failure channel reach the readout heads 48 and 49, a signal to operate the printer may be provided. Article 10 is adjacent the rack for article 9, and the punch in channel 10 is adjacent the channel 9 readout head. And finally, the space reserved for article 1 is adjacent the rack for article 10, and the punch in channel 1 is adjacent the channel 10 readout head.

It will be seen that if the racks properly deliver the articles indicated or called for by signals from the tape channel readout heads 44, then all of the spaces indicated on the conveyor will be full after they have passed the last appropriate storage rack. All of the spaces to be occupied by the example order will be completely filled with the articles when the last article, in this case article 1, is delivered to the conveyor 20. There will be no empty spaces, other than for delivery failure, on the conveyor 20 so that the conveyor 20 is utilized to its maximum capacity. Likewise, it will be seen that the delivery of articles may be in any sequence desired. In the example order just discussed, there is a completely random sequence of articles going from high numbers of articles to low numbers of articles and from low numbers to high numbers of articles. Further, the example order shows that articles may be delivered between already delivered articles, may be delivered behind already delivered articles, or may be delivered in front of already delivered articles. It will also be seen that a succeeding or following order may take its place on the conveyor 20 directly behind the last article 1 of the example order. No space between orders is necessary, although it may be desirable to separate the orders for various reasons such as to convey the orders to different delivery points. If in the next order the first article is an article 9, the operation of this next order may begin as soon as the punch in channel 9 reaches the channel 9 readout head. This punch will cause delivery, if desired, in a space directly behind the space reserved for the last article 1 of the example order. Thus, the article supplying system in accordance with the invention permits a conveyor to be used at substantially its maximum capacity, and at the same time permits any kind and quantity of articles to be called for and delivered. All previous systems for article supplying permit delivery failure to be both sensed and indicated. The system of the invention may present a problem however, because it permits, simultaneously, delivery of articles from a plurality of racks. The use of a delivery failure channel and this method of failure reporting effectively serializes failure information so that a single recording or indicating means may be adapted to failure reporting.

*Alternative embodiments*

Figure 2A:
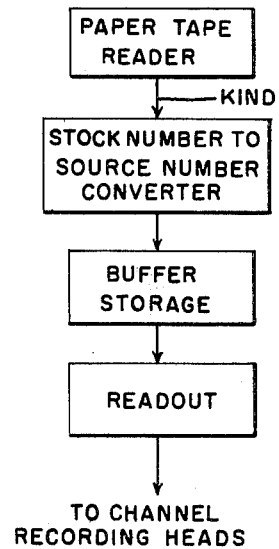
FIGURES 2a and 2b show block diagrams of optional embodiments of the information reading portion for use with the article supplying system shown in FIGURE 1.
Figure 2B:
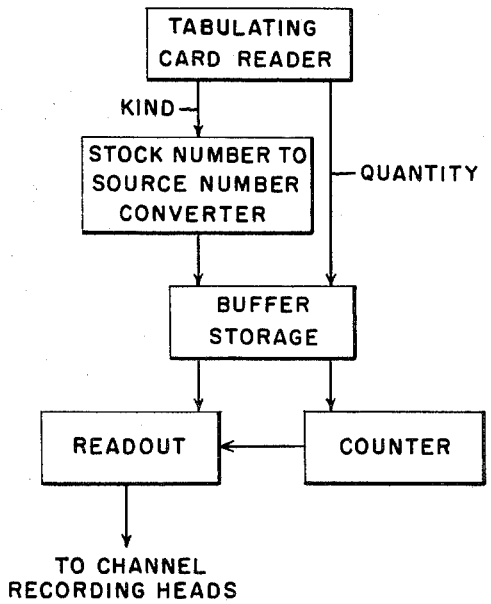

Persons skilled in the art will appreciate that a number of optional and alternative embodiments, features, and arrangements may be used with the system just described in connection with FIGURE 1, without departing from the scope of the invention. A few illustrative optional embodiments will be explained. However, this explanation is not intended to limit the scope of the invention. In FIGURES 2a and 2b, there are shown block diagrams of alternative embodiments of the information reading means and handling means. FIGURE 2a shows a paper tape reader which reads or scans tape punched to indicate the kind of articles desired for delivery. If the signals provided by the tape reader are indicated in terms of stock numbers, it may be desirable or necessary that these stock numbers be converted to the appropriate article source or rack numbers by a stock number converter. Articles of one stock number may be in a particular article storage rack on a given day, while articles of another stock number may be stored in the same article storage rack on a different day. Thus, it may be desirable that some device be provided for converting stock numbers to article storage rack numbers which are in effect at the time that the particular article stock number is desired. Such a converting device may take a number of forms which are known to persons skilled in the art. One such converter might receive a combination of signals representing the digits of the stock number and derive from these signals in a fixed or assignable manner one signal, also representative of the stock number, to energize the tape channel or other information conveying means. The conversion and assignment may be performed by logical circuits composed of transistors, diodes, and resistors, or the like, and may be performed in a parallel mode or in some serial fashion, such as table hookup. After this conversion, or before this conversion if necessary, the signals may be applied to a buffer storage device which stores the signals for application to the tape channel recording heads. Such a storage device is useful in storing signals which require an appreciable length of time to be derived from the tape or information input in comparison to the length of time required for recording. The storage device may store input information as it is read by the tape reader, this stored informaton being retained or stored until appropriate for application to a readout device which, in turn, provides a signal to the tape channel recording heads.

Another embodiment of the information reading and handling means is shown in FIGURE 2b. This embodiment is similar to the embodiment shown in FIGURE 2a, except that information is provided on tabulating cards so that the kind of an article is indicated in one form on the card while the quantity of such article is indicated in another form on the same card. The kind information may be applied to the stock number converter while the quantity information is applied directly to the buffer storage device. The storage device operates in the manner explained in connection with FIGURE 2a, and the kind information is applied to the readout device. The quantity information, however, is applied to a counter which may take any number of forms such as a binary coded decimal counter known to persons skilled in the art. With the quantity information, the counter provides a number of signals for a given kind of article in accordance with the quantity indicated. When the proper quantity of signals has been passed to the channel recording heads, the counter stops the operation and another signal indicative of the next kind of article is read out. The embodiment of FIGURE 2b permits a single block or card of information to call for a plurality of the same kind of articles, while the embodiment of FIGURE 2a contemplates that there be one separate and distinct block of information for each unit of quantity for each kind of article.

In FIGURE 3 there is shown an optional embodiment of a gate which may be used with the article storage racks and the associated circuitry which may be used with such a gate. It is to be understood, however, that this embodiment is optional and is not essential to the invention. The article storage racks may be U-shaped channels which are sloped or arranged so that the articles contained therein tend to flow down toward the conveyor 20 (not shown) by gravity. The racks may be level and provided with article ejecting means. A gate 50 in the form of a plate or similar device projects upward through the base or floor of the channel and prevents the articles from sliding down. The gate 50 may be operated by a solenoid or coil which, when energized, tends to pull the gate 50 downward against a spring (not shown) so that an article may slide or pass over it. The circuit is supplied with an appropriate source of potential relative to ground, such as the indicated direct current potential B plus. When a channel readout head, such as for channel 8, senses a punch, it provides a momentary signal to a delivery memory relay DMR. Three sets of normally open contacts DMR-1, DMR-2, and DMR-3 are associated with the relay DMR. When the relay DMR is energized, its contacts DMR-1, DMR-2, and DMR-3 are closed. The contacts DMR-1 supply the potential B plus to the gate solenoid to open the gate 50. The article 8 is thus permitted to pass over the gate 50 and to be delivered to the conveyor. The contacts DMR-2 seal in the relay DMR to the potential B plus so that the relay DMR can be kept energized after the momentary signal from the channel readout head has gone. The contacts DMR-3 apply the source of potential B plus to a delay relay DR. The relay DR is so arranged that after it is energized or deenergized, there is a delay (for example one second) before its two sets of contacts DR-1 and DR-2 are operated or released. When the relay DR operates, its normally open contacts DR-1 connect the source of potential B plus directly to the delivery failure recorder which punches the tape 40 in the delivery failure channel; and its normally closed contacts DR-2 remove the source of potential B plus from the rest of the circuit. A light 54, energized by a suitable source, is provided on one side of the storage rack, and illuminates a light sensitive device 56, such as a photocell, which is positioned on the other side of the storage rack. The light sensitive device 56 responds to the light and energizes a photoelectric relay PER which has one set of contacts PER-1. The contacts PER-1 are closed when the relay PER is energized. In other words, as long as light reaches the light sensitive device 56, the contacts PER-1 are closed as shown.

The operation of the circuit will be explained. It is assumed that the light 54 is illuminating the light sensitive device 56 and that the contacts PER-1 are closed. If a signal from the tape channel readout head for tape channel 8 is received, the relay DMR is energized. Its contacts DMR-1, DMR-2, and DMR-3 are closed. The gate solenoid opens the gate 50, the relay DMR is sealed in, and the relay DR is energized, but not yet operated. First, it is assumed that the article is properly delivered. The article will pass between the light 54 and the light sensitive device 56 and block the light so that the relay PER is deenergized. If the relay PER is so deenergized before the time in which the relay DR operates, the contacts PER-1 are opened so that the relay DMR is deenergized. The contacts DMR-1, DMR-2, and DMR-3 are opened and restore the circuit to normal. Thus no delivery failure signal is given. The circuit remains in its normal condition until another signal is supplied by its respective tape channel readout head. Second, it is assumed that the article is not delivered for some reason such as being jammed in its storage rack or the storage rack being empty. In this case, the light 54 will not be interrupted and the relay PER remains energized. Therefore, the contacts PER-1 remain closed, the relay DMR remains energized and its contacts DMR-1, DMR-2, and DMR-3 remain closed. The relay DR is energized for its timed interval after which it operates, and its contacts DR-1 are closed to connect the source of potential B plus to the delivery failure recorder, punching the tape in the delivery failure channel for utilization in the printer as previously described. Also when the relay DR operates, its contacts DR-2 are opened to remove the source of potential B plus from the rest of the circuit. The relays DMR and DR are deenergized and the circuit is restored to its normal condition when the delay relay DR resets automatically to await another signal from its tape channel readout head.

Figure 4:
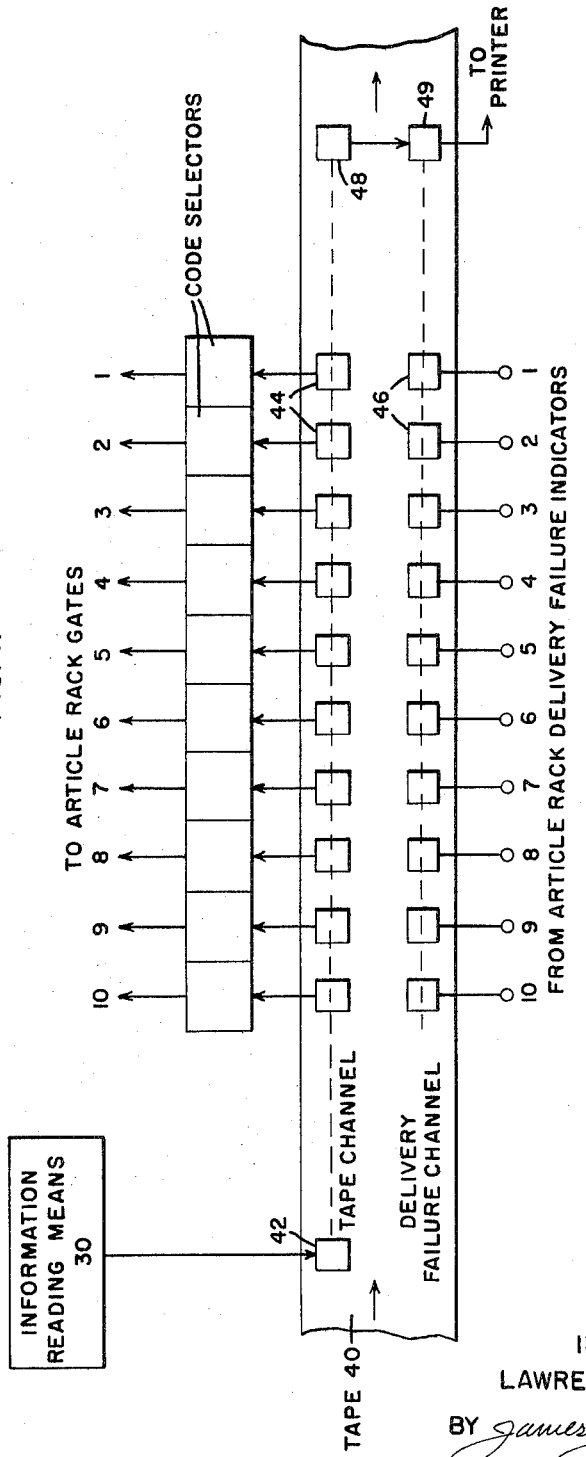
FIGURE 4 shows an optional embodiment of a signal conveyor which may be used with the article supplying system shown in FIGURE 1.
Figure 5:
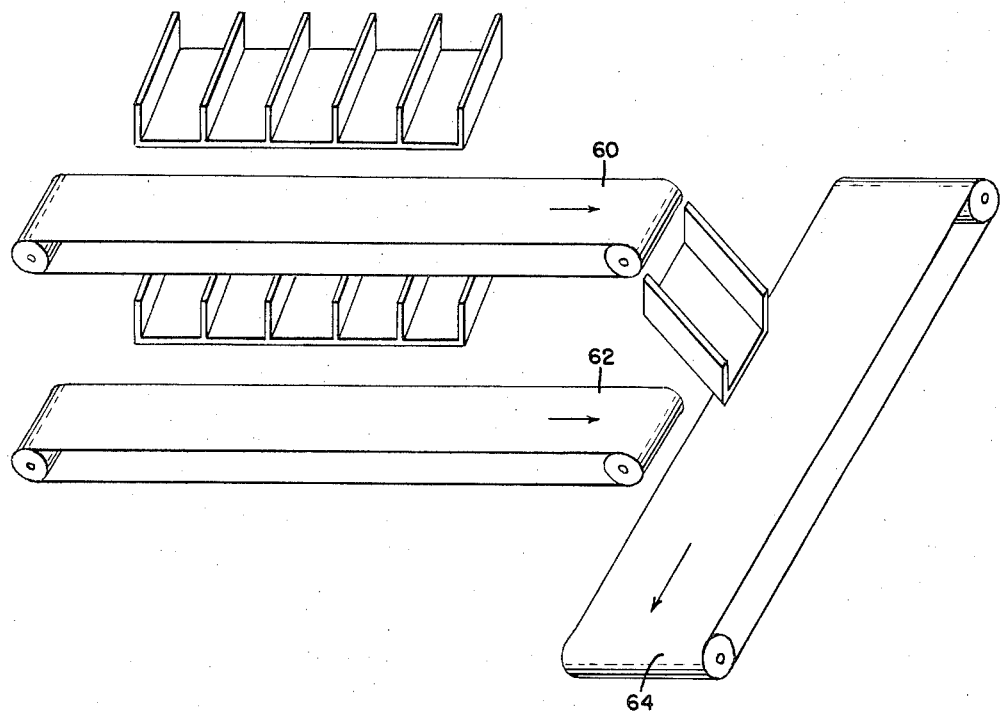
FIGURE 5 shows an optional arrangement of two conveyors which can be used in combination with the article supplying system in an alternate embodiment of the invention.

In addition to the optional and alternative embodiments described, other parts of the system shown in FIGURE 1 may also take different forms. The tape may be replaced by other information conveying devices. Shift registers such as flip-flops or magnetic core shift registers may be utilized if they are capable of providing the necessary information in synchronism with the conveyor. The tape shown in FIGURE 1 may be either a paper tape as described or it may be a magnetic tape. Single channel signal conveying means may be used with code selectors and proper coding or identification of the signal to indicate the article called for. Such a system, partly shown in FIGURE 4, can be used with the conveyor, racks, and other equipment shown in FIGURE 1. The code selectors insure that tape channel signals reach only the proper rack gate as determined by the coding or identification of the tape signals. The code selectors shown in FIGURE 4 may be individually responsive to a plurality of codes so that one code selector may provide signals which are further coded to operate one of a plurality of gates. Thus the code to which a code selector is responsive may have additional codes or information which cause operation of a particular gate of a plurality of gates to which the code selector is coupled, depending on the additional codes. The actual conveyor itself may take many forms in addition to the one shown. For example, the conveyor may be in several independent parts which feed to a single common conveyor. In FIGURE 5 two intermediate conveyors 60, 62 and their associated article racks are provided. The two intermediate conveyors 60, 62 feed or supply their articles to a third or common conveyor 64. Although only two intermediate conveyors 60, 62 have been shown positioned vertically above and below one another, there may be any number of conveyors in many arrangements such as being positioned in the same plane but on opposite sides of the common conveyor 64. It is possible for article storage racks to be positioned or arranged so that two or more such storage racks supply articles to the same point on any given conveyor. In such a circumstance, simultaneous delivery from these two particular storage racks would not normally be permitted. Regardless of the many possible arrangements of the conveyors and the storage racks, the article supplying system of the invention can be used to provide a full conveyor. The only essential is that the ultimate or common conveyor be supplied with articles from its various sources at the appropriate time.

In the various embodiments shown, the article storage racks and the signals on the signal conveying means have been shown as being uniformly or evenly displaced. It is within the scope of the invention to provide storage racks and signals which are not so evenly or uniformly displaced. Persons skilled in the art can visualize instances where such uneven spacing might be necessary. In some instances it is desirable and necessary that different spaces be allotted for the articles, particularly where the articles are not the same size or where articles may require varying times to be delivered to the conveyor. In such instances, additional space with appropriate modification of the signal conveying means can meet such conditions. Although in FIGURE 1 and the description only a single information reading means has been shown, it is possible, and in some instances it may be necessary, that two or more information reading means be provided and be utilized to supply signals to a single signal conveying means. This may be achieved by proper synchronization of the two or more information reading means. Further, it is also possible to use a single delivery failure indicator at the end or some other appropriate point of the common conveyor rather than using a delivery failure indicator for each of the article storage racks. Such a single delivery failure indicator could be one of many known devices which sense the presence of articles on the conveyor, and provided with information as to where each such article should be on the conveyor, can indicate when a required article is absent or a space intended to be empty is full. In the various embodiments, a space signal may be provided on the tape which does not cause any article to be delivered, thus leaving a space on the conveyor for any desired purpose such as the manual supplying of an article. Also, a signal may be provided for stopping the conveyor when read out by a readout head, such a signal being desirable when the conveyor is to be idle for a length of time, or being desirable for any purpose.

In conclusion, it will be appreciated that the article supplying system of the invention enables a conveyor to be supplied with articles in any desired kind, quantity, and sequence, and permits the conveyor to be utilized to substantially its maximum capacity. Although the article supplying system of the invention has been described in connection with specific embodiments, it is again emphasized that persons skilled in the art will appreciate other forms or embodiments. It is to be understood that modifications of the invention may be made by persons skilled in the art without departing from the spirit of the invention or from the scope of the claims.

What I claim as new and desire to secure by Letters Patent of the United States is:

1. In a system for supplying articles from a plurality of spaced sources to at least two intermediate conveyors which in turn supply said articles to a common conveyor, the combination of:
   (a) means for supplying signals indicative of the kind of said articles to be supplied from said sources,
   (b) means coupled to said signal supplying means for conveying said signals at a speed having a relation to the speed of said common article conveyor,
   (c) a plurality of spaced means for deriving said conveyed signals from said signal conveying means,
   (d) and means for coupling each one of said deriving means to a respective one of each of said article sources and for causing said article sources to supply said articles to said intermediate conveyors in response to derived signals,
   (e) each of said deriving means being responsive to conveyed signals corresponding to the article source to which said deriving means is respectively coupled and said deriving means having an effective spacing having said relation to the spacing of said article sources.

2. In a system for supplying articles from a plurality of sources to an article conveyor, the combination of:
   (a) means for supplying signals indicative of the kind of said articles which are to be supplied from said sources,
   (b) means coupled to said signal supplying means for conveying said signals at a speed related to the speed of said article conveyor,
   (c) deriving means adapted to be coupled to each of said article sources for deriving said conveyed signals from said signal conveying means,
   (d) each of said deriving means being responsive to conveyed signals corresponding to the article source to which each of said deriving means is respectively adapted to be coupled,
   (e) and means coupled to said signal supplying means and to said conveyor for indicating a delivery failure in response to a signal calling for a delivery of an article and in response to the absence of such an article on said conveyor.

3. In a system for supplying articles from a plurality of spaced sources to an article conveyor, the combination of:
   (a) means for supplying signals indicative of the kind and quantity in which said articles are to be supplied from said sources,
   (b) means coupled to said signal supplying means for transmitting said signals at a speed bearing some ratio to the speed of said article conveyor,
   (c) a plurality of spaced means for deriving said transmitted signals from said signal transmitting means, the spacing of said deriving means bearing said ratio to the spacing of corresponding and respective article sources,
   (d) means for coupling one of said deriving means to a respective one of each of said article sources,
   (e) each of said deriving means being responsive to transmitted signals corresponding to the article source to which said deriving means is respectively coupled,
   (f) and article delivery failure means coupled to said signal supplying means and to said signal transmitting means for indicating delivery failure, said delivery failure means being responsive to signals from said signal supplying means and the absence of articles on said article conveyor for producing a delivery failure signal in response to said signal supplying means calling for an article and in response to said conveyor failing to have said article.

References Cited by the Examiner

UNITED STATES PATENTS

| | | | |
|---|---|---|---|
| 2,315,659 | 4/1943 | Russell | 214—11 X |
| 2,374,537 | 4/1945 | Goldsmith | 186—1.2 |
| 2,679,354 | 5/1954 | Skillman | 186—1.2 X |
| 2,717,086 | 9/1955 | Bush. | |
| 2,825,476 | 3/1958 | Muller. | |
| 2,941,666 | 6/1960 | Sims. | |
| 2,991,996 | 7/1961 | Kaye | 186—1.2 X |

FOREIGN PATENTS 761,566    11/1956    Great Britain.

GERALD M. FORLENZA, *Primary Examiner.*
HUGO O. SCHULZ, *Examiner.*